United States Patent [19]
Asatsuke et al.

[11] Patent Number: 5,505,287
[45] Date of Patent: Apr. 9, 1996

[54] HYDRAULIC CONTROL APPARATUS FOR MAINTAINING A FILLED CONDITION FOR THE FEED PASSAGES OF NON ENGAGED CLUTCHES

[75] Inventors: Shoji Asatsuke; Tatsuyuki Ohashi; Koichi Kimura, all of Wako, Japan

[73] Assignee: Honda Giken Kogyo Kabushiki Kaisha, Tokyo, Japan

[21] Appl. No.: 250,384

[22] Filed: May 27, 1994

[30] Foreign Application Priority Data

Aug. 20, 1993 [JP] Japan ..................... 5-206427

[51] Int. Cl.⁶ .................... F16D 25/14; F16H 61/00
[52] U.S. Cl. ............. 192/85 R; 74/606 R; 137/625.69
[58] Field of Search .................... 477/70, 86, 127, 477/138, 156, 163; 74/606 R; 137/625.69; 192/85 R, 87.1, 87.13, 87.14, 87.17

[56] References Cited

U.S. PATENT DOCUMENTS

| | | | |
|---|---|---|---|
| 3,683,618 | 8/1972 | Schaher et al. | 192/85 R X |
| 4,499,789 | 2/1985 | Kuramochi et al. | 74/606 R |
| 4,570,511 | 2/1986 | Nishimura et al. | 477/156 X |
| 5,327,800 | 7/1994 | Van Selous | 137/625.69 X |
| 5,379,874 | 1/1995 | Fujita et al. | 137/625.69 X |

FOREIGN PATENT DOCUMENTS

| | | | |
|---|---|---|---|
| 358068535 | 4/1983 | Japan | 477/127 |
| 1-224553 | 9/1989 | Japan . | |
| 2166817 | 5/1986 | United Kingdom | 477/156 |

*Primary Examiner*—Khoi Q. Ta
*Attorney, Agent, or Firm*—Armstrong, Westerman, Hattori, McLeland & Naughton

[57] ABSTRACT

A hydraulic control apparatus for a hydraulically operated vehicular transmission provided with hydraulic engaging elements has a control valve provided with a drain port, and oil discharge passages which are connected, at the time of disengagement of the hydraulic engaging elements, to working oil passages which are in communication with the hydraulic engaging elements. The hydraulic oil to be discharged from the drain port of the control valve is supplied to the oil discharge passages. The apparatus is provided with an oil reservoir for storing therein the hydraulic oil to be discharged from the drain port of the control valve. The oil discharge passages are connected to the oil reservoir.

6 Claims, 4 Drawing Sheets

HYDRAULIC CONTROL APPARATUS FOR MAINTAINING A FILLED CONDITION FOR THE FEED PASSAGES OF NON ENGAGED CLUTCHES

BACKGROUND OF THE INVENTION

1. Field of the Invention

The present invention relates to a hydraulic control apparatus for a hydraulically operated vehicular transmission having hydraulic engaging elements.

2. Description of Related Art

Conventional hydraulic control apparatus of this kind is arranged in the following manner. Namely, pressurized oil from a hydraulic oil pressure source is supplied, via a manual valve, to shift valves after adjusting its pressure by a regulator valve to a certain constant pressure so as to selectively supply it to each of the hydraulic engaging elements such as clutches, brakes, or the like. The hydraulic engaging elements are thus caused to be engaged to establish a desired transmission train. At the time of disengaging the hydraulic engaging elements, each of working oil passages which are in communication with the hydraulic engaging elements is connected to an oil discharge passage via the shift valves so as to discharge the hydraulic oil in the hydraulic engaging elements through the oil discharge passages.

Further, there has recently been proposed the following, for example, in Japanese Published Unexamined Patent Application No. 224553/1989. Namely, in order to alleviate the speed shifting shocks by directly controlling or indirectly controlling (i.e, controlling the back pressure of an accumulator), in an adequate manner, the hydraulic oil pressure in the transient period of engagement of the hydraulic engaging elements, the hydraulic oil pressure in the transient period of the hydraulic engaging elements is feed-back controlled or feed-forward controlled by solenoid proportional valves or the like depending on the operating parameters such as engine load, revolution speed of the engine, revolution speed of rotating elements of the transmission, or the like.

In the above-described conventional apparatus, there are the following disadvantages. Namely, at the time of disengaging the hydraulic engaging elements, the working oil passages which are communicated with the hydraulic engaging elements are opened to the atmosphere through the oil discharge passages. As a result, they will become a condition in which they are empty of the hydraulic oil. When the hydraulic engaging elements that are once disengaged are to be engaged again, the empty working oil passages must first be filled with the working oil before the hydraulic oil pressure in the hydraulic engaging elements can be increased. This will cause a time lag, with the result that a long time is required before the hydraulic engaging elements are brought back to a condition of being engaged. Similarly, in case the transient hydraulic oil pressure in the hydraulic engaging elements is controlled, as described above, by means of solenoid proportional valves or the like, the most appropriate control becomes difficult due to the above-described time lag. Especially, since the degree of emptiness of the working oil passages normally varies in each hydraulic engaging element, the time lag fluctuates in each hydraulic engaging element. This makes an adequate control of the hydraulic engaging elements at the transient period of engagement thereof more difficult, resulting in a lower control accuracy.

SUMMARY OF THE INVENTION

In view of the above-described disadvantages, the present invention has an object of providing an apparatus in which the above-described disadvantages have been solved by raising the hydraulic oil pressure in the hydraulic engaging elements without the time lag.

In order to attain the above-described and other objects, the present invention is a hydraulic control apparatus for a hydraulically operated vehicular transmission provided with hydraulic engaging elements, the apparatus having a control valve provided with a drain port, and oil discharge passages which are connected, at the time of disengagement of the hydraulic engaging elements, to working oil passages which are in communication with the hydraulic engaging elements. The apparatus is provided with means for supplying the hydraulic oil to be discharged from the drain port of the control valve to the oil discharge passages.

At the time of disengagement of the hydraulic engaging elements, the hydraulic oil discharged from the drain port of the control valve flows into the working oil passages which are in communication with the hydraulic engaging elements. The working oil passages are thus filled with the hydraulic oil and, consequently, the hydraulic engaging elements can be set up, or made ready for operation, without the time lag.

In this case, it may be arranged that the discharged hydraulic oil from the drain port of the control valve is directly fed to the oil discharge passages. However, if an oil reservoir for storing the discharged hydraulic oil is provided and the oil discharge passages are connected thereto, the discharged hydraulic oil can be supplied from the oil reservoir to the oil discharge passages with neither an excess nor a shortage. Further, if the working oil passages and the oil discharge passages are arranged to constitute an approximately U-shaped oil duct which opens vertically upwards, it is advantageous in that the hydraulic oil is surely filled in the working oil passages to the equal height as the oil discharge passages.

The control valve shall preferably be a pressure regulating valve, especially a regulator valve to regulate the pressure of the hydraulic oil from the hydraulic oil source to a certain constant pressure.

BRIEF DESCRIPTION OF THE DRAWINGS

The above and other objects and the attendant advantages of the present invention will become readily apparent when considered in conjunction with the accompanying drawings wherein.

DETAILED DESCRIPTION OF A PREFERRED EMBODIMENT

Figure 1:
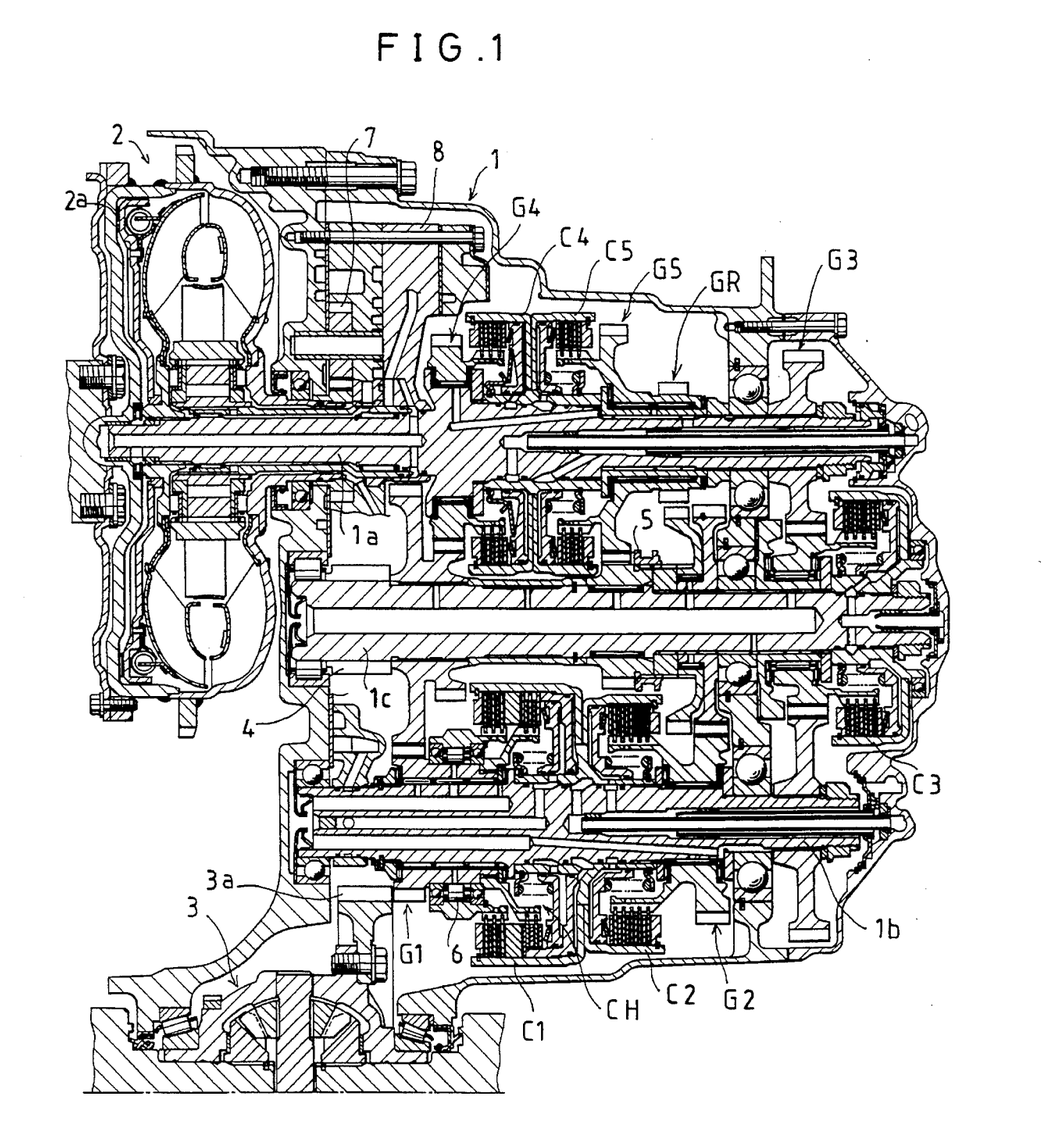
FIG. 1 is a developed sectional view of an example of a transmission to which an apparatus of the present invention is applied.

Referring to FIG. 1, numeral 1 denotes a transmission for effecting the changing or shifting of the speed of a vehicle such as an automobile to five forward speeds and one reverse speed. This transmission 1 comprises a first input shaft 1a which is connected to an engine via a fluid torque converter 2 having a clutch 2a, a second input shaft 1b which is rotated synchronously with the first input shaft 1a, and an output shaft 1c which has an output gear 4 to be meshed with an input gear 3a of a differential gear 3. Between the second input shaft 1b and the output shaft 1c there are parallelly disposed transmission trains G1 and G2 for forward first speed and second speed, respectively. Between the first input shaft 1a and the output shaft 1c there are parallelly disposed transmission trains G3, G4, G5 for forward third speed through fifth speed, respectively, as well as a reverse transmission train GR. In these forward transmission trains there are interposed hydraulic engaging elements in the form of first-speed through fifth-speed hydraulic clutches C1, C2, C3, C4, C5, respectively, so that each of the forward transmission trains can be selectively established through engagement of each of the hydraulic clutches. The reverse transmission train GR is arranged to share the fifth-speed hydraulic clutch C5 with the fifth-speed transmission train G5 so that the fifth-speed transmission train G5 and the reverse transmission train GR can be selectively established by the changeover of a selector gear 5 on the output shaft 1c between the forward position on the left-hand side of the drawing and the reverse position on the right-hand side of the drawing. In the reverse transmission train GR there is interposed an unillustrated idle gear. In addition, the third-speed hydraulic clutch C3 is mounted on an end portion of the output shaft 1c so that the second input shaft 1b can be synchronously rotated with the first input shaft 1a via a gear train for the third-speed transmission train G3 on the input side of the hydraulic clutch C3 and a gear which is fixed to the second input shaft 1b and meshes with the gear train.

In the first-speed transmission train G1 there is provided a one-way clutch 6 which is interposed between the first-speed hydraulic clutch C1 and a gear train, on the output side thereof, for the first-speed transmission train G1 and which is a one-way transmission mechanism for allowing the overrunning of the output side. Furthermore, inside the first-speed hydraulic clutch C1 there is assembled a first-speed holding hydraulic clutch CH whose output side is directly connected to the gear train for the first-speed transmission train G1. The first speed transmission train G1 can thus be established in a condition in which the overrunning of the output side is not allowed by the engagement of the hydraulic clutch CH, i.e., in a condition in which an engine braking can be applied.

Inside the casing of the transmission 1 there is provided a valve block 8 which has assembled therein a pump 7 as a source of hydraulic oil pressure and various valves. Supplying and discharging of hydraulic oil to 5 each of the above-described hydraulic clutches are arranged to be controlled by a hydraulic oil pressure control circuit which is made up of the various valves assembled in the valve block 8.

Figure 2:
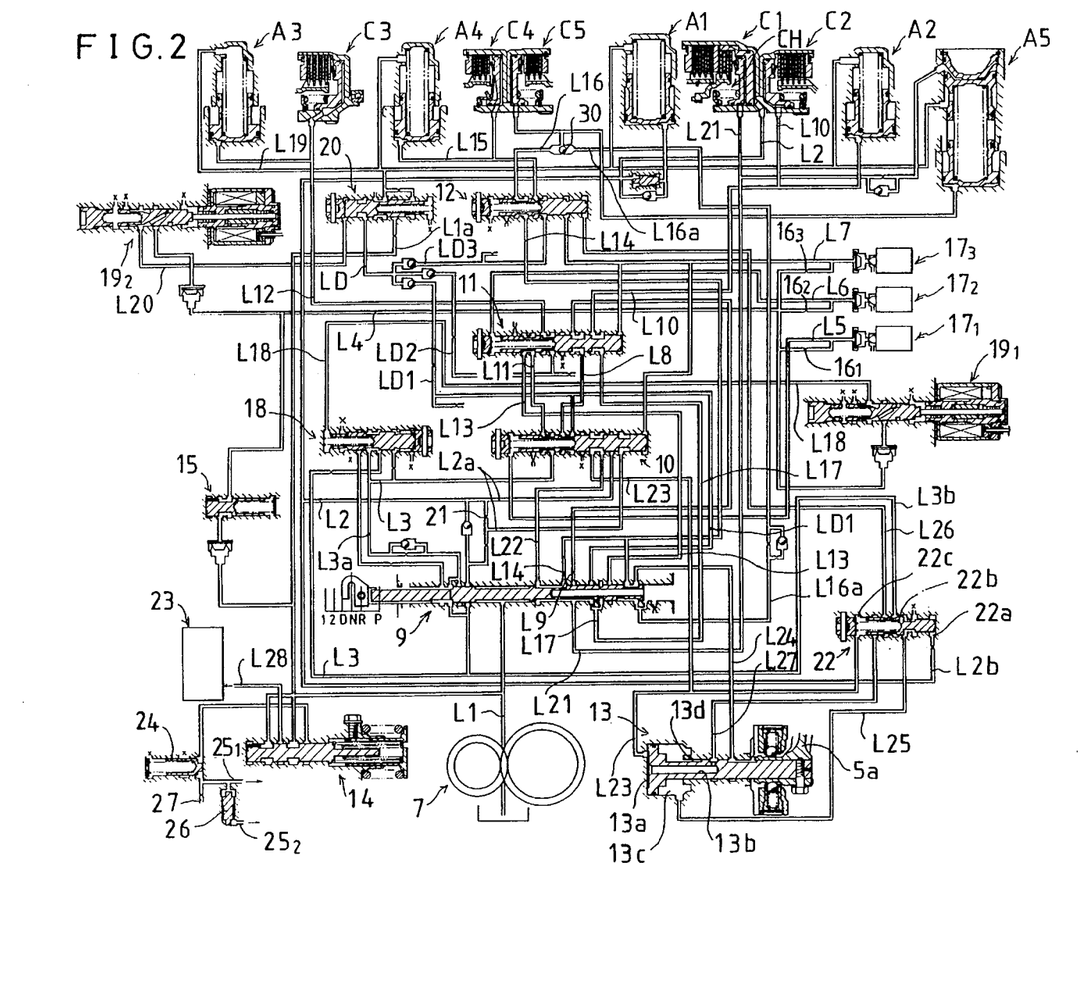
FIG. 2 is a circuit diagram of a hydraulic control circuit thereof.
Figure 3:
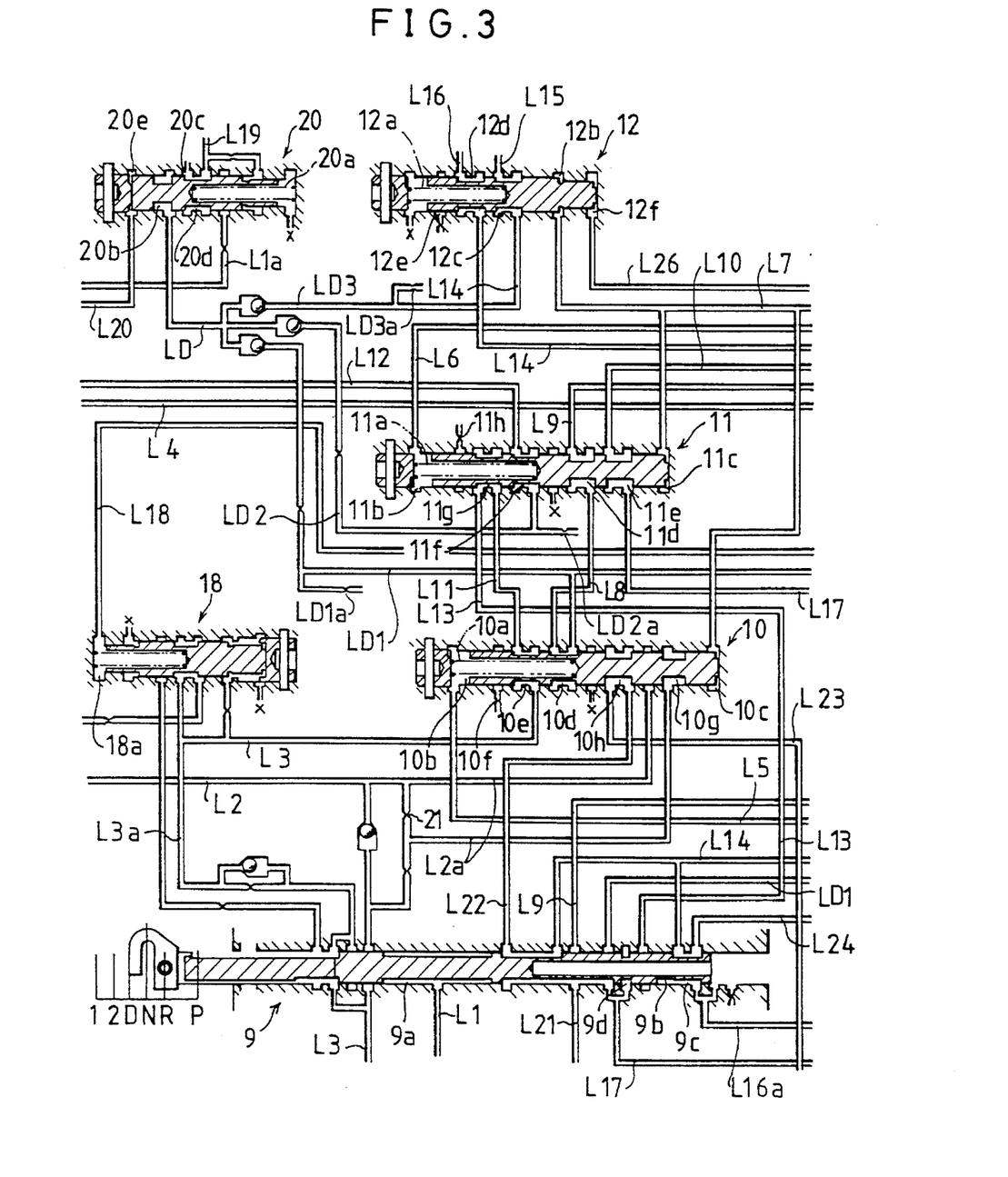
FIG. 3 is an enlarged view of an important portion of the hydraulic control circuit diagram of FIG. 2.

As shown in FIGS. 2 and 3, the hydraulic oil pressure control circuit is provided with a manual valve 9 which can be operated for changing over among a total of six positions of "P" for parking, "R" for reverse running, "N" for neutral, "D" for automatic speed changing, "2" for holding the second speed, and "1" for holding the first speed, three sets of No. 1 through No. 3 shift valves 10, 11, 12, and a servo valve 13, to which is connected a shift fork 5a of the selector gear 5, for changing over between forward and reverse running. In the "D" position of the manual valve 9, No. 1 oil passage L1 which is in communication with the oil pump 7 is connected to No. 2 oil passage L2 which is in communication with the first-speed hydraulic clutch C1 and to No. 3 oil passage L3 which is in communication with No. 1 shift valve 10 via an annular groove 9a of the manual valve 9. Pressurized oil which is adjusted by a regulator valve 14 to a constant line pressure is supplied from No. 1 oil passage L1 to No. 2 and No. 3 oil passages L2, L3 and, consequently, the hydraulic oil supply can be made to the first-speed hydraulic clutch C1 and to the second-speed through the fifth-speed hydraulic clutches C2, C3, C4, C5 via No. 1 through No. 3 third shift valves 10, 11, 12.

The above-described shift valves 10, 11, 12 are respectively so arranged as to be able to be changed over against respective springs 10a, 11a, 12a from the right-hand side position to the left-hand side position. A modulator pressure (a constant pressure which is lower than the line pressure) from a modulator valve 15 which is connected to No. 1 oil passage L1 is arranged to be inputted to an oil chamber 10b on the left end of No. 1 shift valve 10 via No. 5 oil passage L5 which is in communication, via an orifice $16_1$, with No. 4 oil passage L4 on the output side of the modulator valve 15, as well as to an oil chamber 11b on the left end of No. 2 shift valve 11 via No. 6 oil passage L6 which is in communication, via an orifice $16_2$, with No. 4 oil passage L4. The modulator pressure is also arranged to be inputted to an oil chamber 12b on the right-hand side of No. 3 shift valve 12 via No. 7 oil passage L7 which is in communication, via an orifice $16_3$, with No. 4 oil passage L4, as well as to oil chambers 10c, 11c on the right ends of No. 1 and No. 2 shift valves 10, 11 respectively. To these No. 5 through No. 7 oil passages L5, L6, L7 there are respectively connected No. 1 through No. 3 normally-closed type solenoid valves $17_1$, $17_2$, $17_3$ which respectively open the oil passages to the atmosphere. These solenoid valves $17_1$, $17_2$, $17_3$ can thus be controlled to be opened or closed by an unillustrated electronic control circuit comprising a microcomputer or the like so that No. 1 through No. 3 shift valves 10, 11, 12 can be changed over in response to each of the transmission trains as described hereinbelow.

Namely, at the first speed, No. 1 solenoid valve $17_1$ is opened and No. 2 and No. 3 solenoid valves $17_2$, $17_3$ are closed. According to this operation, the modulator pressure is inputted to the oil chamber 10c on the right end of No. 1 shift valve 10, and No. 1 shift valve 10 is consequently changed over to the left-hand side position. The modulator pressure is also inputted to the oil chambers 11b, 11c on the left end and the right end, respectively, of No. 2 shift valve 11 to thereby cause the right and the left urging forces by the modulator pressure to be well balanced. As a result, No. 2 shift valve 11 is changed over to the right-hand side position by means of the spring 11a. In this condition, No. 3 oil passage L3 is connected to No. 8 oil passage L8 via an annular groove 10d of No. 1 shift valve 10, and No. 8 oil passage L8 is connected to No. 9 oil passage L9 via an annular groove 11d of No. 2 shift valve 11. However, since the downstream end of No. 9 oil passage L9 is blocked by the manual valve 9 in the "D" position thereof, no hydraulic oil is supplied to the second-speed through the fifth-speed hydraulic clutches C2 through C5 but is supplied 5 only to the first-speed hydraulic clutch C1, thereby establishing the first-speed transmission train G1.

At the second speed, No. 2 solenoid valve $17_2$ is opened from the above-described condition. According to this operation, the supply of the modulator pressure to the oil chamber 11b on the left end of No. 2 shift valve 11 is stopped, with the result that No. 2 shift valve 11 is changed over to the left-hand side position. In this condition, No. 8 oil passage L8 is connected to No. 10 oil passage L10, which is in communication with the secondspeed hydraulic clutch C2, via an annular groove 11e of No. 2 shift valve 11. The hydraulic oil is therefore supplied to the second-speed hydraulic clutch C2 to thereby establish the second-speed transmission train G2. In this case, through the operation of the above-described one-way clutch 6, the power transmission via the first-speed transmission train G1 is automatically stopped.

At the third speed, No. 1 solenoid valve $17_1$ is closed from the condition of the second speed. According to this operation, the modulator pressure is supplied to the oil chamber 10b on the left end of No. 1 shift valve 10, so that No. 1 shift valve 10 is changed over to the right-hand side position. In this condition, No. 3 oil passage L3 is connected to No. 11 oil passage L11 via an annular groove 10e of No. 1 shift valve 10, and No. 11 oil passage L11 is connected to No. 12 oil passage L12, which is in communication with the third-speed hydraulic clutch C3, via an annular groove 11f of No. 2 shift valve 11 which is in the left-hand side position, thereby supplying the hydraulic oil to the third-speed hydraulic clutch C3. On the other hand, No. 8 oil passage L8 which is connected to No. 10 oil passage L10 in communication with the second-speed hydraulic clutch C2 is connected, via an annular groove 10d of No. 1 shift valve 10, to No. 1 oil discharge passage LD1 so as to discharge the hydraulic oil from the second-speed hydraulic clutch C2, thereby establishing the third-speed transmission train G3.

At the fourth speed, No. 2 solenoid valve $17_2$ is closed from the condition of the third speed. According to this operation, the modulator pressure is inputted to the oil chamber 11b on the left end of No. 2 shift valve 11 so as to change over No. 2 shift valve 11 to the right-hand side position. In this condition, No. 11 oil passage L11 is connected to No. 13 oil passage L13 via an annular groove 11g of No. 2 shift valve 11. No. 14 oil passage L14 which is connected, in the "D" position of the manual valve 9, to No. 13 oil passage L13 via a notched groove 9b and an annular groove 9c of the manual valve 9 is connected, via an annular groove 12c of No. 3 shift valve 12 which is in the left-hand side position, to No. 15 oil passage L15 which is in communication with the fourth-speed hydraulic clutch C4. The hydraulic oil is thus supplied to the fourth-speed hydraulic clutch C4. On the other hand, No. 12 oil passage L12 which is in communication with the third-speed hydraulic clutch C3 is connected to No. 2 oil discharge passage LD2 via an annular groove 11f of No. 2 shift valve 11 so as to discharge the hydraulic oil from the third-speed hydraulic clutch C3, thereby establishing the fourth-speed transmission train G4.

At the fifth speed, No. 3 solenoid valve $17_3$ is opened from the condition of the fourth speed. According to this operation, the supply of the modulator pressure to the oil chamber 12b of No. 3 shift valve 12 is stopped and, consequently, No. 3 shift valve 12 is changed over to the right-hand side position by means of the spring 12a. In this condition, No. 14 oil passage L14 is connected, via an annular groove 12d of No. 3 shift valve 12, to No. 16 oil passage L16 which is in communication with the fifth-speed hydraulic clutch C5, thereby supplying the hydraulic oil to the fifth-speed hydraulic clutch C5. On the other hand, the No. 15 oil passage L15 which is in communication with the fourth-speed hydraulic clutch C4 is connected to No. 3 oil discharge passage LD3 via the annular groove 12c of No. 3 shift valve 12 so as to discharge the hydraulic oil from the fourth-speed clutch C4, thereby establishing the fifth-speed transmission train G5.

At the time of downshifting from the fifth speed to the fourth speed, No. 16 oil passage L16 is connected to an oil discharge port 12e via the annular groove 12d of No. 3 shift valve 12 that is in the left-hand side position, thereby discharging the hydraulic oil from the fifth-speed hydraulic clutch C5. At the time of downshifting from the fourth speed to the third speed, No. 13 oil passage L13 that is connected via No. 14 oil passage L14 to No. 15 oil passage L15 is connected to an oil discharge port 11h via an annular groove 11g of No. 2 shift valve 11 that is in the left-hand side position, thereby discharging the hydraulic oil from the fourth-speed clutch C4. At the time of downshifting from the third speed to the second speed, No. 11 oil passage L11 that is connected to No. 12 oil passage L12 via an annular groove 11f of No. 2 shift valve 11 that is in the left-hand side position is connected, via the annular groove 10e of No. 1 shift valve 10 that is in the left-hand side, to an oil discharge port 10f, thereby discharging the hydraulic oil from the third-speed hydraulic clutch C3. At the time of downshifting from the second speed to the first speed, No. 17 oil passage L17 that is connected, in the "D" position of the manual valve 9, to No. 1 oil discharge passage LD1 via the annular groove 9d of the manual valve 9 is connected, via the annular groove 11e of No. 2 shift valve 11 that is in the right-hand side position, to No. 10 oil passage L10 so as to discharge the hydraulic oil from the second-speed hydraulic clutch C2.

The opening and closing of the solenoid valves $17_1$, $17_2$, $17_3$ and the changeover positions of the shift valves 10, 11, 12 at each transmission train can be summarized as shown in the following Table 1.

TABLE 1

|  | No. 1 solenoid valve | No. 2 solenoid valve | No. 3 solenoid valve | No. 1 shift valve | No. 2 shift valve | No. 3 shift valve |
| --- | --- | --- | --- | --- | --- | --- |
| First speed | open | closed | closed | left | right | left |
| Second speed | open | open | closed | left | left | left |
| Third speed | closed | open | closed | right | left | left |
| Fourth speed | closed | closed | closed | right | right | left |
| Fifth speed | closed | closed | open | right | right | right |

There is interposed in No. 3 oil passage L3 a pressure regulator valve 18. The output pressure from No. 1 solenoid proportional valve $19_1$ which is connected to No. 4 oil passage L4 on the output side of the modulator valve 15 is inputted, via No. 18 oil passage L18, to an oil chamber 18a on the left end of the pressure regulator valve 18. It is thus so arranged that, at the time of shifting the speed, the pressure rise characteristics of a hydraulic clutch to be engaged are controlled via the pressure regulator valve 18 by No. 1 solenoid proportional valve $19_1$ to prevent the occurrence of speed-change shocks.

In the drawings numerals A1, A2, A3, A4, A5 denote accumulators which are provided to alleviate sudden pressure changes in the first-speed through the fifth-speed hydraulic clutches C1, C2, C3, C4, C5. Numeral 20 denotes a discharge oil control valve to which No. 1 through No. 3 discharge oil passages LD1, LD2, LD3 are connected after combining them into one. When the discharge oil control valve 20 is moved to the right against a spring 20a, a combined discharge oil passage LD is connected, via an annular groove 20b of the discharge oil control valve 20, to an oil discharge port 20c. Also, a branch oil passage L1a of No. 1 oil passage L1 is connected, via an annular groove 20d of the discharge oil control valve 20, to No. 19 oil passage L19 which is in communication with back pressure chambers of the above-described accumulators A1 through A5 so that the line pressure can be inputted to the back pressure chambers. To an oil chamber 20e on the left end of the discharge oil control valve 20, there is inputted, via No. 20 oil passage L20, an output pressure from No. 2 solenoid proportional valve $19_2$ which is in communication with No. 4 oil passage L4. At the time of speed changing, the hydraulic oil pressure in No. 19 oil passage L19, i.e., the back pressure of the accumulators A1 through A5, is controlled by No. 2 solenoid proportional valve $19_2$ via the discharge oil control valve 20. The pressure drop characteristics of a hydraulic clutch to be disengaged are thus controlled so that a suitable simultaneous engagement with another hydraulic clutch to be engaged takes place. Thereafter, when the hydraulic clutch to be engaged has substantially been engaged, the discharge oil control valve 20 is pushed to the right utmost end. In order for the hydraulic oil to be thereby discharged also from the oil discharge port 20c in addition to each of the oil discharge ports LD1a, LD2a, LD3a with orifices of No. 1 through No. 3 oil discharge passages $LD_1$, $LD_2$, $LD_3$, the combined oil discharge passage LD is caused to be in communication with the oil discharge port 20c so as to decrease the oil discharging resistance of the hydraulic clutch to be disengaged. The back pressure of the accumulators is also increased to the line pressure to force out the hydraulic oil remaining in the oil passages of a hydraulic clutch to be disengaged. In this manner, the hydraulic pressure of the hydraulic clutch to be disengaged is arranged to be quickly decreased.

In addition, in order to alleviate the gear-in shocks or shocks at the time of gear engagement, a squat control is made such that, at the time of gearing in for starting by changing over the manual valve 9 from the "P" or "N" position to the "D" position, No. 1 shift valve 10 is moved to the right-hand side position and No. 2 shift valve 11 to the left-hand side position, thereby once establishing the third-speed transmission train G3. Thereafter, the first shift valve 10 is changed over to the left-hand side position and No. 2 shift valve 11 to the right-hand side position, thereby establishing the first-speed transmission train G1. At this time, in order to surely attain the torque transmission by the third-speed transmission train G3, it is necessary to prevent the hydraulic oil pressure of the first-speed hydraulic clutch C1 from rising earlier than that of the third-speed hydraulic clutch C3. For that purpose, there is provided a small-diameter orifice 21 in No. 2 oil passage L2. Furthermore, in order for the hydraulic oil pressure in the first-speed hydraulic clutch C1 to quickly rise at the time of downshifting from the third speed to the first speed, there is provided in No. 2 oil passage L2 a bypass passage L2a which is in parallel with the orifice 21 so that, by changing over No. 1 shift valve 10 to the left-hand side position, the bypass passage L2a can be opened via an annular groove 10g of No. 1 shift valve 10.

In the "2" position of the manual valve 9, No. 1 oil passage L1 is connected, via the annular groove 9a of the manual valve 9, to No. 2 oil passage L2 and No. 3 oil passage L3 and also to the bypass passage L3a which is in communication with the downstream side of No. 3 oil passage L3, so that the line pressure is inputted to No. 1 shift valve 10 without passing through the pressure regulator valve 18. Further, the communication is cut off between No. 13 oil passage L13 and No. 14 oil passage L14 which connect No. 2 shift valve 11 and No. 3 shift valve 12, and No. 13 oil passage L13 is connected to No. 17 oil passage L17 via the annular groove 9c and the notched groove 9b of the manual valve 9. Here, in the position, No. 1 solenoid valve $17_1$ and No. 2 solenoid valve $17_2$ are both closed to thereby change over No. 1 shift valve 10 and No. 2 shift valve 11 to the right-hand side position. According to this operation, No. 3 oil passage L3 is connected to No. 10 oil passage L10 via No. 11 oil passage L11, No. 13 oil passage L13, and No. 17 oil passage L17, whereby the hydraulic oil is supplied to the second-speed hydraulic clutch C2 to establish the second-speed transmission train G2. According to this arrangement, even if No. 1 shift valve 10 and No. 2 shift valve 11 were restrained, through a failure of the solenoid valves $17_1$, $17_2$, $17_3$, valve stick or the like, to a condition in which No. 1 shift valve 10 and No. 2 shift valve 11 are both positioned in the right-hand side position (i.e., a condition of the fourth speed or the fifth speed in the "D" position), a strong driving power can advantageously be obtained by establishing the second-speed transmission train G2 by positioning the manual valve 9 in the "2" position.

When a sudden downshifting is made, while running at a high speed in the "D" position, to the second-speed transmission train G2 by changing over to the "2" position, overrunning of the engine or large shifting shocks may sometimes occur. As a solution, the following arrangement has been made. Namely, when a changeover has been made to the "2" position at above a predetermined vehicle speed, No. 1 solenoid valve $17_1$ and No. 3 solenoid valve $17_3$ are both closed, and No. 2 solenoid valve $17_2$ is opened so as to change over No. 1 shift valve 10 to the right-hand side position and No. 2 shift valve 11 to the left-hand side position. No. 3 oil passage L3 is thus connected to No. 12 oil passage L12 via No. 11 oil passage L11 to supply the hydraulic oil to the third-speed hydraulic clutch C3, thereby establishing the third-speed transmission train G3. Once the vehicle speed has been decreased below a predetermined speed, No. 2 solenoid valve $17_2$ is closed to change over No. 2 shift valve 11 to the right-hand side position, thereby establishing the second-speed transmission train G2.

In the "1" position of the manual valve 9, while No. 1 oil passage L1 is connected, via the annular groove 9a of the manual valve 9, to No. 2 oil passage L2, No. 3 oil passage L3 and the bypass passage L3a, as in the "2" position, No. 13 oil passage L13 and No. 17 oil passage L17 are connected together via the annular groove 9c of the manual valve 9. Furthermore, No. 9 oil passage L9 on the downstream side of No. 2 shift valve 11 is connected, via the annular groove 9d of the manual valve 9, to No. 21 oil passage L21 which is in communication with the first-speed holding hydraulic clutch CH. Here, in the "1" position, No. 1 solenoid valve $17_1$ is opened and No. 2 solenoid valve $17_2$ and No. 3 solenoid valve $17_3$ are closed to thereby change over No. 1 shift valve 10 to the left-hand side position and No. 2 shift valve 11 to the right-hand side position. According to this operation, No. 3 oil passage L3 is connected to No. 21 oil passage L21 via No. 8 oil passage L8 and No. 9 oil passage L9. As a result, the hydraulic oil is supplied to the first-speed holding clutch CH so as to establish the first-speed transmission train G1 in a condition in which engine braking can be applied. When changeover is made to the "1" position at a vehicle speed above a predetermined speed, No. 1 solenoid valve $17_1$ and No. 2 solenoid valve $17_2$ are both closed to change over No. 1 shift valve 10 and No. 2 shift valve 11 both to the right-hand side position. Thus, like at the above-described second speed in the position, No. 3 oil passage L3 is connected to No. 10 oil passage L10 via No. 11 oil passage L11, No. 13 oil passage L13, and No. 17 oil passage L17 to supply the hydraulic oil to the second-speed hydraulic clutch C2, thereby establishing the second-speed transmission train G2. When the vehicle speed has been decreased below a predetermined speed, No. 1 shift valve 10 is changed over, as described above, to the left-hand side position to establish the first-speed transmission train G1.

In the "R" position of the manual valve 9, No. 1 oil passage L1 is connected, via the annular groove 9a of the manual valve 9, to No. 22 oil passage L22 which is in communication with the first shift valve 10. In this case, No. 1 shift valve 10 is changed over to the right-hand side position by the closing operation of No. 1 solenoid valve $17_1$, so that No. 22 oil passage L22 is connected, via an annular groove 10h of No. 1 shift valve 10, to No. 23 oil passage L23 which is in communication with the left end oil chamber 13a of the servo valve 13. According to this operation, the servo valve 13 is moved to the right by the line pressure which is inputted via No. 23 oil passage L23, whereby the selector gear 5 is changed over to the reverse position on the right-hand side position. In the reverse position, No. 23 oil passage L23 is connected, via an axial bore 13b of the servo valve 13 which is in communication with the oil chamber 13a, to No. 24 oil passage L24 which is in communication with the manual valve 9. No. 24 oil passage L24 is so arranged as to be connected, via the annular groove 9c of the manual valve 9 in the "R" position thereof, to a branch oil passage L16a which is branched via a shuttle valve 30 from No.16 oil passage L16 which is in communication with the fifth-speed hydraulic clutch C5. Thus, the reverse transmission train GR is established by the changing over of the selector gear 5 to the reverse position and the supplying of the hydraulic oil to the fifth-speed hydraulic clutch C5.

When the manual valve 9 is changed over from the "R" position to the forward running position of "D", "2" or "1", the line pressure is inputted to an oil chamber 13c on the right-hand side of the servo control valve 13 via the branch oil passage L3b which is branched from an upstream portion of No. 3 oil passage L3, the servo valve 22 and No. 25 oil passage L25. The selector gear 5 is thus moved to the left to change over the selector gear 5 to the forward running position on the left-hand side position. In this case, if the changing over is made from the "R" position to "D" "2" or "1" position in a condition in which the wheels are slipping, the selector gear 5 sometimes moves to the left from the reverse position while the output shaft 1c is still running through inertia in the opposite direction, with the result that the changing over to the forward running position cannot be made smoothly. As a solution, the following arrangement has been made. Namely, the hydraulic oil pressure of the first-speed hydraulic clutch C1 is caused to be applied, via a branch oil passage L2b of No. 2 oil passage L2, to the right end of the servo control valve 22. Thus, when the hydraulic oil pressure in the first-speed hydraulic clutch C1 has increased to a certain degree and, consequently, the reverse rotation of the output shaft 1c has been restricted or braked by the engaging force of the first-speed hydraulic clutch C1, the servo control valve 22 is moved to the left to thereby connect the branch oil passage L3b to No. 25 oil passage L25, whereby the servo valve 13 is moved to the left. Further, the hydraulic oil pressure in No. 23 oil passage L23 is caused to be applied to the left end of the servo control valve 22 so that the servo control valve 22 can positively be returned to the right-hand side position at the time of reverse running. Further, there are provided No. 26 oil passage L26 which is in communication with the right end oil chamber 12f of No. 3 shift valve 12 and No. 27 oil passage L27 which, in the reverse position of the servo valve 13, is in communication with the right side oil chamber 13c of the servo valve 13 via a notched groove 13d thereof. No. 26 oil passage L26 is arranged to be changed over, in the right-hand side position of the servo control valve 22, to the branch oil passage L3b and, in the left-hand side position thereof, to No. 27 oil passage L27. According to this arrangement, if the selector gear 5 will not be changed over to the forward position because, when the manual valve 9 is changed over from the "R" position to the "D" position, the servo control valve 22 is restrained to the right-hand side position or because the servo valve 13 is restrained to the reverse position even if the servo control valve 22 has been changed over to the left-hand side position, the line pressure is inputted to the right-end oil chamber 12f of No. 3 shift valve 12 from the branch oil passage L3b or from No. 27 oil passage L27 via No. 26 oil passage L26. As a result, No. 3 shift valve 12 is forcibly changed over to the left-hand side position, so that the hydraulic oil cannot be supplied to the fifth-speed hydraulic clutch C5, thereby inhibiting the establishment of the reverse transmission train GR in the "D" position.

In the "N" position of the manual valve 9, the communication is cut off between No. 1 oil passage L1 and the remaining oil passages. In the "P" position, No. 1 oil passage L1 is connected to No. 22 oil passage L22 to move No. 1 shift valve 10 to the left-hand side position. Consequently, No. 22 oil passage L22 is connected to No. 23 oil passage L23 to change over the servo valve 13 to the reverse position., In the "P" position, however, No. 24 oil passage L24 is not connected to the branch oil passage L16a and, therefore, the reverse transmission train GR is not established.

In the drawings, numeral 23 denotes a hydraulic control circuit for the clutch 2a for the fluid torque converter 2. This control circuit regulates the hydraulic clutch 2a by supplying the working hydraulic oil to be supplied from the regulator valve 14 via No. 28 oil passage L28 in the direction of engaging the clutch or in the direction of disengaging it.

Surplus hydraulic oil that is not supplied to No. 1 oil passage L1 or No. 28 oil passage L28 is partly supplied from the regulator valve 14 via a relief valve 24 to the lubricating portions around the first input shaft 1a via No. 1 lubricating oil passage $25_1$ and to the lubricating portions around the second input shaft 1b and the output shaft 1c via No. 2 lubricating oil passage $25_2$ in which a choke type throttle 26 is interposed. The remaining of the surplus hydraulic oil is discharged via a drain port 27 having an orifice.

Figure 4:
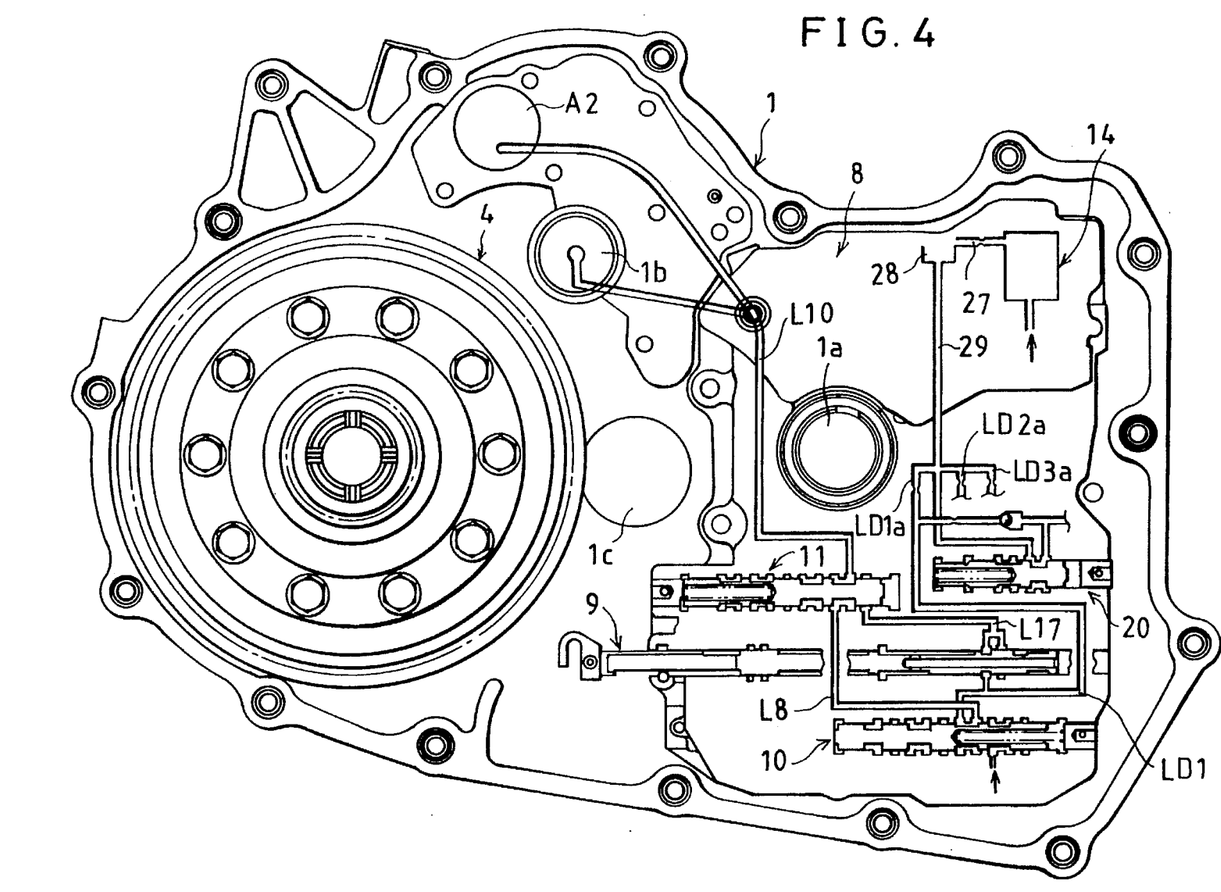
FIG. 4 is a schematic diagram showing the layout of oil passages.

Here, the hydraulic oil to be discharged from the drain port 27 is designed, as shown in FIG. 4, to be stored in an oil reservoir 28 which is provided in the valve block 8. To this oil reservoir 28 there are connected, via a connecting oil passage 29, the oil discharge port 20c of the oil discharge control valve 20, oil discharge ports LD1a, LD2a, LD3a of the oil discharge passages LD1, LD2, LD3, and the oil discharge ports 10f, 11h, 12e of No. 1 through No. 3 shift valves 10, 11, 12. According to this arrangement, the working oil passages in communication with the respective hydraulic clutches are filled with the hydraulic oil to be supplied from the oil reservoir 28 at the time when the second-speed through the fifth-speed hydraulic clutches C2 through C5 are not engaged. It follows that, at the time of engagement of those respective clutches, their hydraulic oil pressures rise at the time of their engagement without a time lag, with the result that the control accuracy of the hydraulic pressures at the transient period of engagement can be improved.

FIG. 4 shows a condition in which, as a result of upshifting from the second speed to the third speed, No. 10 oil passage L10, which is the working oil passage for the second-speed hydraulic clutch C2, is connected to No. 1 oil discharge passage LD1 via No. 2 shift valve 11, No. 8 oil passage L8 and No. 1 shift valve 10 (at the time of downshifting to the first speed, No. 10 oil passage L10 is connected to No. 1 oil discharge passage LD1 via No. 2 shift valve 11, No. 17 oil passage L17 and the manual valve 9). A piston chamber of the second-speed hydraulic clutch C2 which is provided on the second input shaft 1b is thus communicated with the oil reservoir 28 via an approximately U-shaped oil duct which is made up of these oil passages and which opens vertically upwards. By positioning the oil reservoir 28 at substantially the same height as the second input shaft 1b, the hydraulic oil can be kept filled throughout the piston chamber of the second hydraulic clutch C2. Further, by arranging the oil reservoir 28 in this manner, the hydraulic oil can be filled, at the time of disengagement of the hydraulic clutches, throughout the piston chambers of the third-speed through the fifth-speed hydraulic clutches C3, C4, C5 on the first input shaft 1a and the output shaft 1c which are located in position below the second input shaft 1b. In order to eliminate the effects of the centrifugal oil pressure at the time of disengagement, the hydraulic clutches C2 through C5 are respectively provided with conventional check valves (not illustrated) which open the piston chambers into atmosphere by opening them through the centrifugal force. Therefore, even if a low-pressure oil were to flow into the piston chambers at the time of disengagement, there will occur no such disadvantage as the dragging of the clutches.

Further, instead of providing the oil reservoir 28, the following arrangement may be considered. Namely, the connecting oil passage 29 is branched before the open end of the drain port 27 so as to supply the discharged oil from the regulator valve 14 directly to the connecting oil passage 29. However, in order to supply each of the hydraulic clutches with an adequate amount of working hydraulic oil with neither an excess nor a shortage, it is better to provide the oil reservoir 28 as described above.

As can be seen from the above description, according to the present invention, the hydraulic oil can be kept filled in the working oil passages at the time of disengagement of the hydraulic engaging elements. Therefore, at the time of engaging the hydraulic engaging elements, the hydraulic oil pressure in the hydraulic engaging elements can be increased without time lag. Consequently, the control of the hydraulic pressure can be accurately made at the transient time of engagement.

It is readily apparent that the above-described hydraulic control apparatus meets all of the objects mentioned above and also has the advantages of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A hydraulic control apparatus for a hydraulically operated vehicular transmission provided with hydraulic engaging elements, said apparatus comprising:

a control valve having a drain port;

oil discharge passages which are connected, by switching means at the time of disengagement of said hydraulic engaging elements, to working oil passages which are in communication with said hydraulic engaging elements; and means for supplying hydraulic oil to be discharged from said drain port of said control valve to said oil discharge passages.

2. A hydraulic control apparatus for a hydraulically operated vehicular transmission provided with hydraulic engaging elements, said apparatus comprising:

a control valve having a drain port;

oil discharge passages which are connected, by switching means at the time of disengagement of said hydraulic engaging elements, to working oil passages which are in communication with said hydraulic engaging elements; and an oil reservoir for storing therein hydraulic oil to be discharged from said drain port of said control valve, said oil discharge passages being connected to said oil reservoir.

3. A hydraulic control apparatus for a hydraulically operated vehicular transmission according to claim 1 or 2, wherein said working oil passages and said oil discharge passages are arranged to constitute an approximately U-shaped oil duct which opens vertically upwards.

4. A hydraulic control apparatus for a hydraulically operated vehicular transmission according to claim 1 or 2, wherein said control valve is a pressure regulating valve.

5. A hydraulic control apparatus for a hydraulically operated vehicular transmission according to claim 4, wherein said pressure control valve is a regulator valve which adjusts the hydraulic oil pressure from a hydraulic oil source to a certain constant pressure.

6. A hydraulic control apparatus for a hydraulically operated vehicular transmission according to claim 3, wherein said control valve is a pressure regulating valve.

* * * * *